H. WILLARD.
Meat Broiler.
No. 102,348. Patented April 26, 1870.
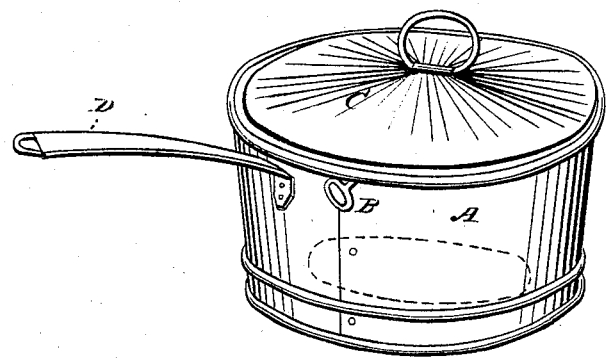
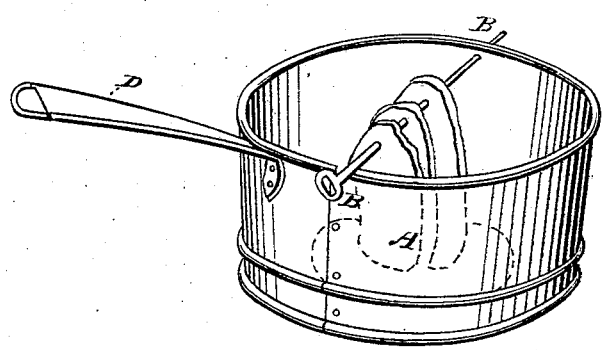
Witnesses
F. Raynsford
Benjamin T. Harlow
Inventor
Henderson Willard

United States Patent Office.

HENDERSON WILLARD, OF GRAND RAPIDS, MICHIGAN.

Letters Patent No. 102,348, dated April 26, 1870.

BROILER FOR MEAT.

The Schedule referred to in these Letters Patent and making part of the same.

I, HENDERSON WILLARD, of Grand Rapids, Michigan, have invented a new Device for Broiling Meat, of which the following is a specification.

Broiled meat is more wholesome food than fried meat, because it is cooked with less contact with hot iron.

By laying the meat down flat for broiling, it necessarily cooks faster on one side than on the other, and consequently it has to be turned. In this way both sides of the meat are made to rest on hot iron.

My invention relates to a new device for broiling meat by suspending it, in a bottomless broiler, over the fire above the draught, so that neither blaze nor smoke can reach it, but the heat, unobstructed, can rise and fill the broiler.

By thus suspending the meat in the broiler instead of laying it flat down, the following advantages are secured, viz:

First, the meat is cooked with the least possible contact with hot iron, the point of suspension being the only point of contact.

Second, both sides of the meat broil alike at the same time, thus saving the trouble of turning the meat.

Third, by cooking both sides at the same time the juices are retained in the meat.

Fourth, twice as much can be cooked at a time by thus suspending it as could be if it lay flat.

This broiler may be made of any desired size or shape, and of any suitable material. The meat may be carved and strung on wires, the ends of which may rest in holes or slots made in opposite sides of the broiler.

These hangers or spit may be attached to the broiler in various ways, or to the under side of the cover. The cover, with hangers or spit only, may be used as a broiler when the fire in the stove is low.

The drawing represents a broiler constructed with reference to suspending the meat in it over the fire for broiling.

A is the body;
B B are the hangers or spit;
C is the cover; and
D D, the handle.

When used on a stove a griddle should be removed.

I claim as my invention—

The bottomless meat-broiler, constructed substantially as described, in which the meat is suspended from spits, or their equivalents, vertically over the fire, in such a manner that the only point of contact of the meat with any part of the metal shall be the points of suspension, as herein set forth.

February 1, 1870.

HENDERSON WILLARD.

Witnesses:
F. RAYNSFORD,
BENJAMIN A. HARLAN.